G. F. DICKSON.
CONFECTIONER'S MELTING TABLE.
APPLICATION FILED OCT. 19, 1908.
938,414.
Patented Oct. 26, 1909.
2 SHEETS—SHEET 1.
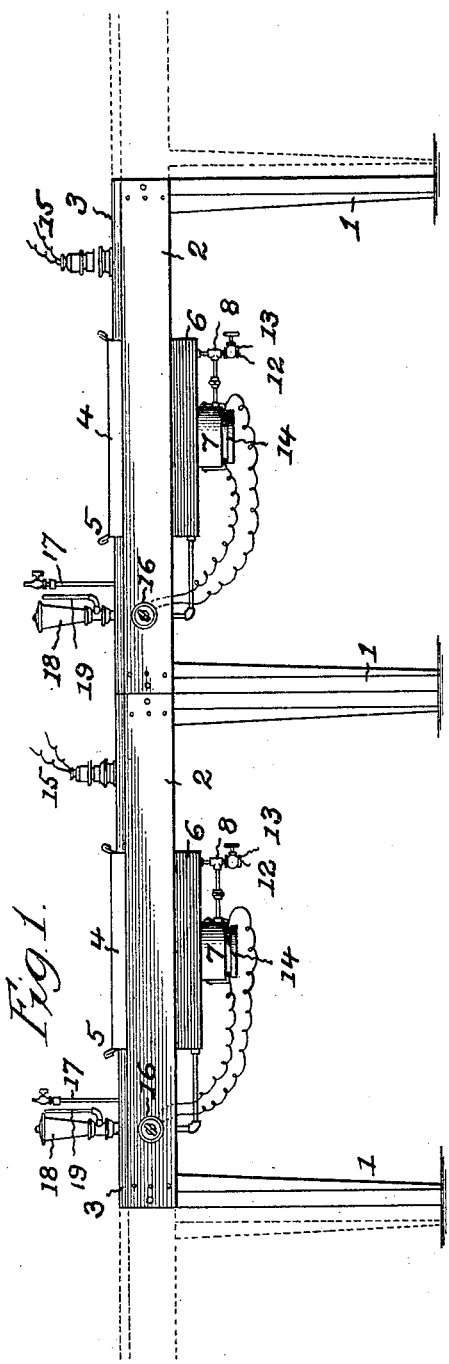
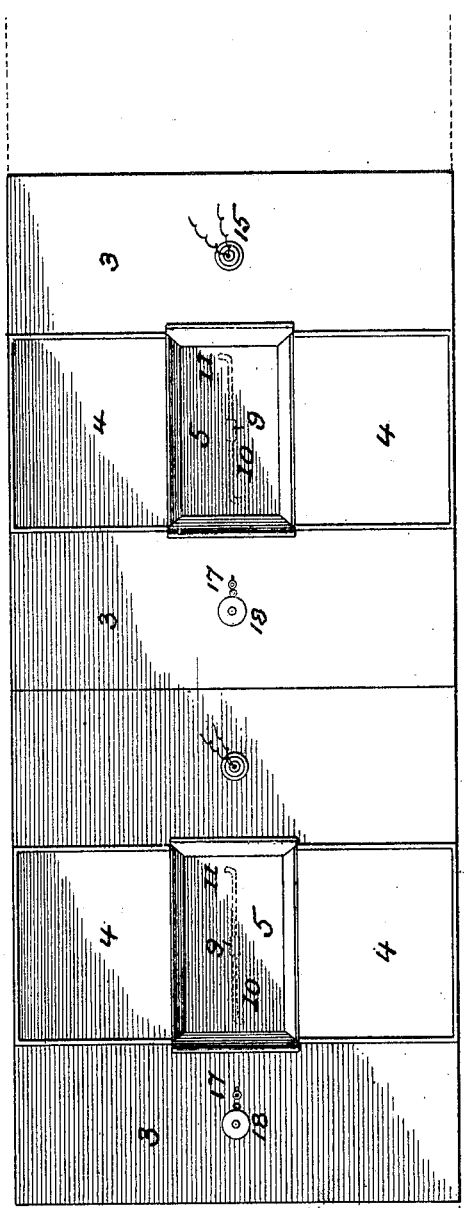
Witnesses:
Henry Mor.
Chas. H. Buell.
Inventor:
George F. Dickson,
By Robert Burns
Atty.

G. F. DICKSON.
CONFECTIONER'S MELTING TABLE.
APPLICATION FILED OCT. 19, 1908.
938,414.
Patented Oct. 26, 1909.
2 SHEETS—SHEET 2.
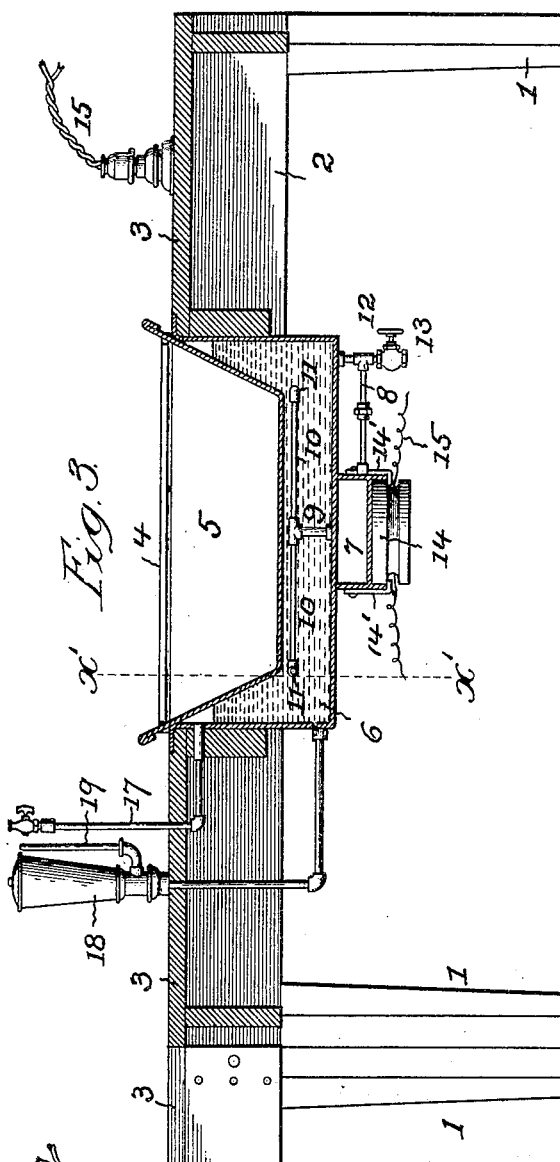
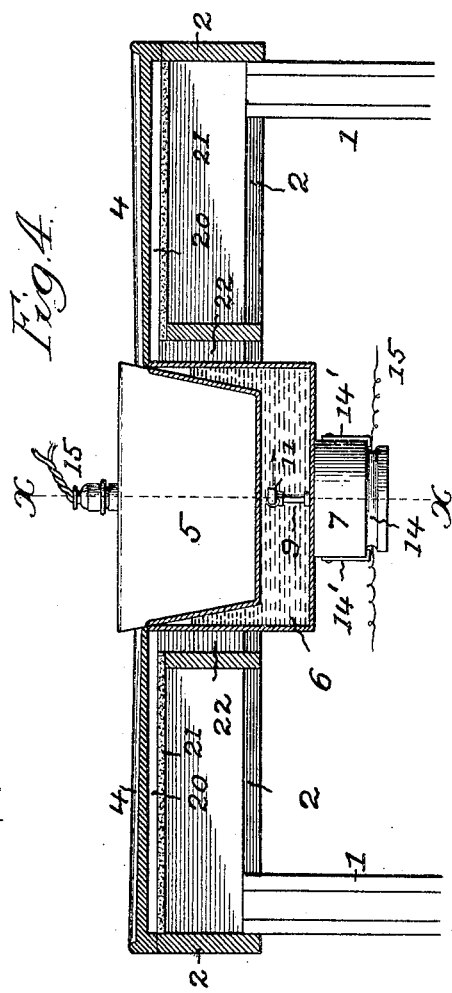
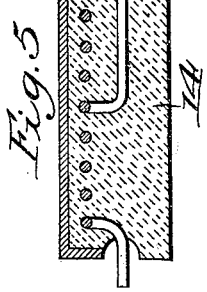
Witnesses:
Henry Moe.
Chas. H. Buell.
Inventor:
George F. Dickson,
By Robert Burns
Atty.

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

CONFECTIONER'S MELTING-TABLE.

938,414.  Specification of Letters Patent.  Patented Oct. 26, 1909.

Application filed October 19, 1908. Serial No. 458,347.

*To all whom it may concern:*

Be it known that I, GEORGE F. DICKSON, a citizen of the United States of America, and a resident of Chicago, in the county of Cook and State of Illinois, have invented certain new and useful Improvements in Confectioners' Melting-Tables, of which the following is a specification.

This invention relates to that type of melting tables for confectioners' use in the manufacture of chocolate coated confections, and which forms the subject matter of my prior patent No. 730,748, dated June 9, 1903. And the present improvement has for its object to provide a simple and efficient structural formation of the table by means of which a mild, uniform and readily controlled heating action is attained in the heating vat, and whereby the chocolate or like substance is maintained in a melted condition without liability to scorching during extended practical use of the apparatus; all as will hereinafter more fully appear.

In the accompanying drawings:—Figure 1, is a front elevation of a pair of table units assembled. Fig. 2, is a plan view of the same. Fig. 3, is a longitudinal section on line $x$—$x$ Fig. 4, with parts in elevation. Fig. 4, is a transverse section on line $x'$—$x'$ Fig. 3. Fig. 5, is a detail vertical section of the electrical heating means.

Similar numerals of reference indicate like parts in the several views.

The general construction of the table will be substantially the same as set forth in my aforesaid prior patent No. 730,748, and will comprise corner legs 1 by which the horizontal table top is supported. Such table top comprises an underframe 2, fixed end boards 3, and a pair of removable operating slabs 4, of marble or the like, between which the centrally arranged open top melting pan or vat 5, is located.

The pan 5 is removably supported by the underframe 2 aforesaid, in a plane beneath the operating slabs, and is provided with upright splash plates 5' at each end to prevent side splash of the contents of the pan, as set forth in detail in my prior patent aforesaid.

6 is a heating chamber formed in the underframe 2 and adapted to receive the melting pan 5, which depends into said chamber and forms a closed top for said chamber as shown.

7 is a secondary chamber formed by a casing secured to the bottom plate of the heating chamber 6, the two chambers being in communication by the following means: 8 is an inlet pipe to the chamber 7; such pipe extending from the bottom portion of the chamber 6 to the lower portion of the chamber 7. 9 is a vertical outlet pipe from the chamber 7; such pipe extends vertically into the upper chamber 6 and is provided with horizontal branches 10 and curved outlet ends 11, the outlet of water from which is adapted to impart circular movement to the body of water contained in the chamber 6 to aid in maintaining such water at a uniform temperature throughout. With the described construction and with heat applied to the chamber 7 a very effective circulation of the water through the chambers 6 and 7 is attained. 12 is a downwardly extending branch of the inlet pipe 8, provided with a valve 13, and adapted for use in drawing off the water from the chambers 6 and 7, when required.

14 is an electrical heater or resistance arranged within a recess in the bottom of the secondary chamber 7, as shown in Fig. 3, and held in contact with said bottom by spring clips 14' or like fastening means. By such construction the accumulation of scale upon the surface of the electrical heater is prevented, such accummulation being a serious defect where the heater has been directly immersed in the water of the water-containing chambers aforesaid.

15 is a conductor extending from the electric heater 14, aforesaid, to a suitable source of electro-motive force.

16 is a rheostat or controller arranged in said circuit and located at the side of the underframe 2 in convenient reach of an operator, and adapted to afford a ready means for increasing or decreasing the heating effect of the heater 14 aforesaid.

17 is a valved vent pipe connecting with the upper part of the heating chamber 6, and adapted to permit the escape of the air confined therein in filling said chamber with water.

18 is an elevated filling tank, having pipe connection with the lower part of the heating chamber and adapted for convenient filling of said chamber, and the maintenance of the proper supply of water therein.

19 is a gage glass arranged at the side of the elevated filling tank, 18, and connected thereto at its lower end, to visibly indicate the height of water in said tank.

20 are horizontal spaces formed beneath the operating slabs 4, and horizontal boards 21 of stand, and which have communication with open bottom spaces 22, adjacent to the heating chamber 6, so that the radiant heat from said chamber will be conveyed to the air confined in said spaces, to aid in maintaining the operating slabs 4, in a properly heated condition.

Having thus fully described my said invention what I claim as new and desire to secure by Letters Patent, is:—

1. In a confectioner's melting table of the character herein described, the combination of a table top formed with an open top heating chamber adapted to contain a supply of water, a removable open top melting pan arranged in said chamber, a heater of the electrical resistance type adapted to heat the water in said chamber, and an electrical connection extending to a source of electro-motive force.

2. In a confectioner's melting table of the character herein described, the combination of a table top formed with an open top heating chamber, adapted to contain a supply of water, a removable open top melting pan arranged in said chamber, a secondary water chamber arranged beneath said open top chamber and having a circulation connection therewith, a heater of the electrical resistance type adapted to heat the water in said secondary chamber, and an electric connection extending to a source of electro-motive force.

3. In a confectioner's melting table of the character herein described, the combination of a table top formed with an open top heating chamber adapted to contain a supply of water, a removable open top melting pan arranged in said chamber, a secondary water chamber arranged beneath said open top chamber and having a circulation connection therewith, said circulation connection comprising in part a vertical outlet pipe and horizontal branch pipes having curved outlet ends, a heater of the electrical resistance type adapted to heat the water in said secondary chamber, and an electric connection extending to a source of electro-motive force.

Signed at Chicago, Illinois, this 15th day of October 1908.

GEORGE F. DICKSON.

Witnesses:
ROBERT BURNS,
HENRY MOE.